United States Patent
Renshaw

(10) Patent No.: US 9,410,397 B2
(45) Date of Patent: Aug. 9, 2016

(54) SOLENOID-OPERATED VALVE

(75) Inventor: James R. Renshaw, Cheshire (GB)

(73) Assignee: Bifold Fluidpower Limited, Middleton (GB)

( * ) Notice: Subject to any disclaimer, the term of this patent is extended or adjusted under 35 U.S.C. 154(b) by 0 days.

(21) Appl. No.: 14/232,059

(22) PCT Filed: Jul. 5, 2012

(86) PCT No.: PCT/GB2012/051578
§ 371 (c)(1),
(2), (4) Date: Jan. 10, 2014

(87) PCT Pub. No.: WO2013/011274
PCT Pub. Date: Jan. 24, 2013

(65) Prior Publication Data
US 2014/0352971 A1 Dec. 4, 2014

(30) Foreign Application Priority Data

Jul. 15, 2011 (GB) .................................. 1112284.3

(51) Int. Cl.
*F16K 31/04* (2006.01)
*F16K 11/07* (2006.01)
*F16K 31/12* (2006.01)
*E21B 34/04* (2006.01)
(Continued)

(52) U.S. Cl.
CPC ............... *E21B 34/04* (2013.01); *F16K 27/048* (2013.01); *F16K 31/0613* (2013.01); *F16K 31/0658* (2013.01); *F16K 39/022* (2013.01)

(58) Field of Classification Search
USPC .................................................. 137/625.68
See application file for complete search history.

(56) References Cited

U.S. PATENT DOCUMENTS 5,497,672 A * 3/1996 Appleford ............... E21B 34/04
  185/40 R
6,149,124 A * 11/2000 Yang ..................... F16K 31/408
  251/30.03

(Continued)

FOREIGN PATENT DOCUMENTS

GB 2417546 3/2006
WO 2005012508 1/2008

OTHER PUBLICATIONS

International Written Opinion for Application No. PCT/GB2012/051578 dated Oct. 8, 2012 (4 pages).

(Continued)

*Primary Examiner* — Matthew R Buck
*Assistant Examiner* — Douglas S Wood
(74) *Attorney, Agent, or Firm* — Michael Best & Friedrich LLP

(57) ABSTRACT

A solenoid-operated valve of the kind that is used in a subsea control pod comprises a valve assembly (2) and a solenoid assembly (1). The valve assembly (2) comprising has fluid ports (P, S, T) for the receipt and delivery of hydraulic control fluid and a valve element (37, 38, 39) that is actuable between open and closed positions in order to control the flow of hydraulic control fluid between the fluid ports. The valve element (37, 38, 39) is actuable by an actuating member of the solenoid assembly (1). The solenoid chamber (A) is filled with oil and sealed against ingress of hydraulic control fluid from the valve chamber (36) and from the ingress of oil and/or seawater from the control pod. A movable pressure balancing device (30) is provided in the solenoid assembly (1) so as to ensure that the internal pressure of the oil in the solenoid chamber (A) and the external pressure of the oil in the control pod are balanced.

19 Claims, 3 Drawing Sheets

(51) Int. Cl.
*E21B 33/035* (2006.01)
*F16K 31/06* (2006.01)
*F16K 27/04* (2006.01)
*F16K 39/02* (2006.01)

(56) References Cited

U.S. PATENT DOCUMENTS 7,367,357 B2 * 5/2008 Kim .................... F16K 31/0631
　　　　　　　　　　　　　　　　　　　　137/596.17

2007/0205383 A1　9/2007　McMiles
2010/0043897 A1　2/2010　Grace et al.
2011/0126912 A1　6/2011　Grimseth et al.

OTHER PUBLICATIONS

GB1112284.3 Search Report dated Oct. 24, 2011 (3 pages).
International Search Report for International Application No. PCT/GB2012/051578 dated Oct. 8, 2012 (4 pages).

* cited by examiner

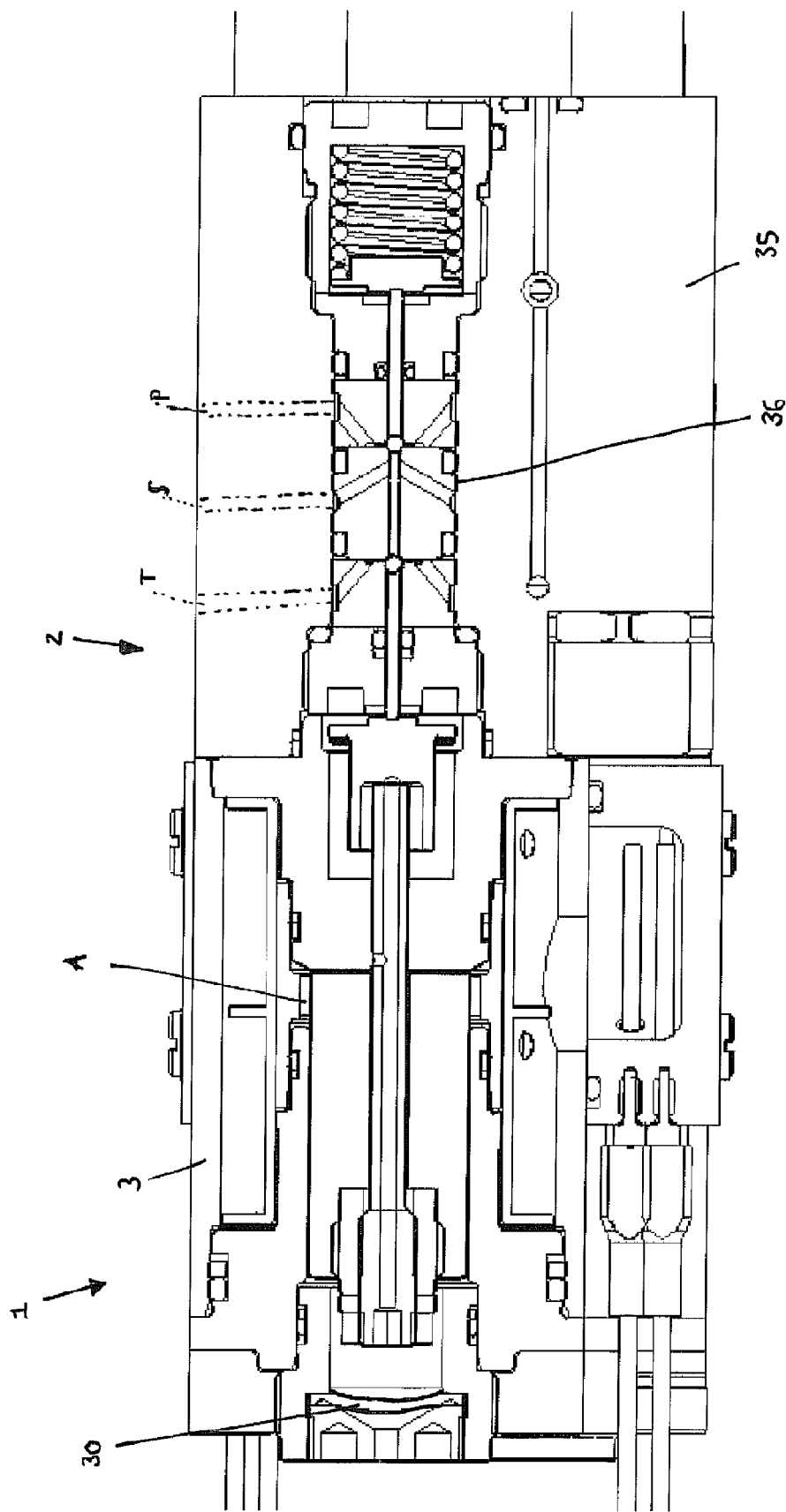

SOLENOID-OPERATED VALVE

BACKGROUND

The present invention relates to a solenoid-operated valve and more particularly, but not exclusively, to such a valve for use underwater in a control system of a subsea wellhead for the extraction of oil and/or gas.

In subsea drilling, large actuators or process valves associated with the wellhead are typically controlled by smaller main-stage valves and pilot-operated valves. These smaller valves are hydraulically and/or electrically-operated and may be housed within a subsea container known as a control "pod" so that they are protected from the surrounding environment. The pod is sealed against the ingress of sea water and has a one or more connectors for connection to a supply of hydraulic fluid and/or electric power for operation of the valves. The pod is typically filled with a suitable oil so that it immerses and enters the valves. The oil typically contains a corrosion inhibitor and serves as an electrical insulator.

Some valves may be designed such that they are sealed against the ingress of pod oil and are instead flooded with hydraulic control fluid.

In some instances it is possible for sea water to ingress into the pod. For example, the pod may develop a leak. In the instance where the valves are flooded with pod oil, the ingress of seawater into the pod can lead to seawater entering the valves which undesirable as it increases the risk of corrosion of valve parts. In the instance where valves are flooded with hydraulic control fluid there is still a risk of seawater entering the valve via connectors disposed on the pod for connection to corresponding connectors provided on the end of an umbilical (a collection of lines, hoses or tubes through which control fluid and electrical power may be supplied) that extends from a topside production platform or vessel.

The armature of a solenoid-operated valve is designed to have relatively high magnetic permeability so as to ensure that the force applied the actuator is sufficient for to move the valve member without unduly high electrical power being consumed. Such materials are vulnerable to corrosion and it is thus common to apply a suitable coating to the armature such as, for example, nickel plating.

It has been found that the oil or hydraulic control fluid that enters the solenoid cavity from the pod or the rest of the valve can cause the solenoid actuator to jam. In particular, over time the running gap between the solenoid actuator and the surrounding armature becomes filled with a sticky deposit or gum-like substance. It is thought that the problem may be caused by the corrosion inhibitor and/or other additives in the oil/control fluid chemically degrading the nickel plating on the armature.

The content of hydraulic control fluid is regulated by industry or government standards to avoid harmful substances being vented into the sea. Such control fluids have a high water content and the volume of additives is being increasingly restricted for environmental reasons. This increases the risk of corrosion of valve parts and, in particular, solenoid operators.

It is an object of the present invention to obviate or mitigate the aforementioned disadvantages. It is also an object to provide for an alternative or improved solenoid-operated valve.

SUMMARY

According to a first aspect of the present invention there is provided a solenoid-operated valve comprising a valve assembly and a solenoid assembly, the valve assembly comprising: a body with fluid ports for the receipt and delivery of hydraulic control fluid, a valve element disposed in a valve chamber, the valve element being actuable between open and closed positions in order to control the flow of hydraulic control fluid between the fluid ports, the valve element being actuated by a solenoid assembly; the solenoid assembly comprising at least one coil for generating a magnetic field and an actuating member disposed in a solenoid chamber for displacement by the magnetic field, the actuating member being coupled to the valve element, wherein the solenoid chamber is sealed against ingress of hydraulic control fluid from the valve chamber and from the ingress of fluid from the environment surrounding the solenoid assembly, and a movable pressure balancing device provided between the solenoid chamber and the surrounding environment, the balancing device having a first surface exposed to the internal pressure within the solenoid chamber and a second surface for exposure to the external pressure of the surrounding environment, the device being movable so as to ensure the forces acting on the first and second surfaces are balanced.

The external pressure of the surrounding environment will, in use, be the pressure of the oil within a control pod in which the valve is contained. The internal pressure will be that of the hydraulic fluid sealed within the solenoid chamber, such fluid being isolated from the hydraulic control fluid which, is use, is present in the valve chamber.

The isolation of the solenoid assembly prevents ingression into the solenoid chamber of any sea water that is present in the pod. It also prevents any seawater present in the hydraulic control fluid from entering the solenoid chamber.

The valve assembly is designed to selectively open and interrupt a hydraulic control fluid supply path that, in use, would extend between a source and an inlet of a fluid handing member that requires control such as, for example, a main-stage valve.

The pressure balancing device may take any suitable form. It may comprise a single component or may comprise an assembly of components.

In one preferred embodiment the pressure balancing device is in the form of a flexible diaphragm. The diaphragm may be retained in the solenoid assembly by a clamping arrangement. For example it may be clamped at its periphery so as to leave a region in-board of its periphery exposed to the respective fluids. The diaphragm deflects according to the forces applied by the prevailing pressures acting on each surface.

In another embodiment the pressure balancing device is a piston that is sealed to the housing. A first piston surface is exposed to the solenoid chamber and an opposed second piston surface is exposed to the pressure of the surrounding environment.

The clamping arrangement may be provided by a support member that is screwed into a housing of the solenoid assembly. The support member may define an annular shoulder against which the diaphragm is clamped by a clamping member.

The solenoid assembly may comprise a solenoid housing and the valve assembly may comprise a valve housing. The two housings may be integrally formed or may be separate components that are fixed together permanently or which may be separably connected together.

The actuator may be in the form of a push rod which may carry an armature member.

The solenoid assembly may further comprise one or more pole pieces in which the armature member is supported for sliding or floating movement. The pole pieces may be substantially cylindrical and disposed radially inboard of the at least one coil. The solenoid chamber may be defined at least in part by at least one bore in the pole pieces There is preferably an isolating seal provided between valve chamber and solenoid assembly so as to prevent hydraulic control fluid from entering the solenoid assembly and in particular the solenoid chamber. The seal may be provided around the valve element of the valve assembly and/or around the actuator of the solenoid.

The valve element may comprise at least one substantially spherical element for sealing against a valve seat. The spherical valve element may be axially movable within the valve chamber between a closed position in which it seals against the seat and an open position in which it is displaced from the seat. The valve element may further comprise at least one actuating pin arranged coaxially with the valve seat for moving the spherical valve element to the open or closed position. The at least one actuating pin is preferably connected, directly or indirectly to the solenoid actuating member.

The housing may comprise at least first and second ports for the hydraulic control fluid.

A first fluid path may be defined between the first and second ports and passing through the chamber.

There may be a third port and a second path defined between the second and third ports with the chamber being disposed at the intersection of the first and second paths/The spherical member is moveable to open or close the first and second fluid paths.

In one embodiment there may be a second spherical valve element with a corresponding valve seat and a further actuating pin between the two spherical valve elements. The pins and spherical elements are arranged in the valve chamber such that when the first spherical valve element is displaced from its seat (so as to open the first fluid path) it moves the further actuating pin which in turn forces the second valve element on to its seat (so as to close the second fluid path).

There may be provided a biasing member that applies a force against the actuating member.

The valve assembly may be a two-position, three way valve.

According to a second aspect of the present invention there is provided a subsea control pod containing at least one solenoid-operated valve as defined above, the pod containing a first hydraulic fluid, the valve assembly being connectable to a source of hydraulic control fluid via a conduit provided in the pod for supplying hydraulic control fluid to the valve chamber, the solenoid chamber being filled with a second hydraulic fluid.

The first and second hydraulic fluids may be of the same type or may be different. They may be a suitable oil such as synthetic hydrocarbon based oil. The hydraulic control fluid may be, for example, a water based fluid containing, for example, ethylene glycol.

The pod preferably has a connector for connection to the source of hydraulic control fluid, the valve chamber being in fluid communication with the connector.

According to a third aspect of the present invention there is provided a method for operating a subsea solenoid-operated valve that comprises a valve assembly and a solenoid assembly, the method comprising connecting the fluid ports of the valve assembly into a hydraulic control fluid supply path that, in use, extends between a source of control fluid and an inlet to a fluid handling member that requires control, such that the control fluid enters a valve chamber of the valve assembly, providing a valve element that is actuable between open and closed positions in order to control the flow of hydraulic control fluid between the fluid ports, the valve element being actuable by a solenoid assembly; the solenoid assembly comprising at least one coil for generating a magnetic field and an actuating member disposed in a solenoid chamber for displacement by the magnetic field, the actuating member being coupled to the valve element, the method further comprising filling the solenoid chamber with a first hydraulic fluid and isolating the filled solenoid chamber by sealing it against ingress of hydraulic control fluid from the valve chamber and sealing the solenoid chamber from the ingress of fluid from the environment surrounding the solenoid assembly, providing a movable pressure balancing arrangement in the solenoid assembly, the balancing device having a first surface exposed to the internal pressure within the solenoid chamber and a second surface for exposure to the external pressure of the surrounding environment, the device being movable so as to ensure the forces acting on the first and second surfaces are balanced.

BRIEF DESCRIPTION OF THE DRAWINGS

A specific embodiment of the present invention will now be described with reference to the accompanying drawings in which:

FIG. 3 is a longitudinal section view according to FIG. 1, with a pressure diaphragm in a first position

DETAILED DESCRIPTION

Figure 1:
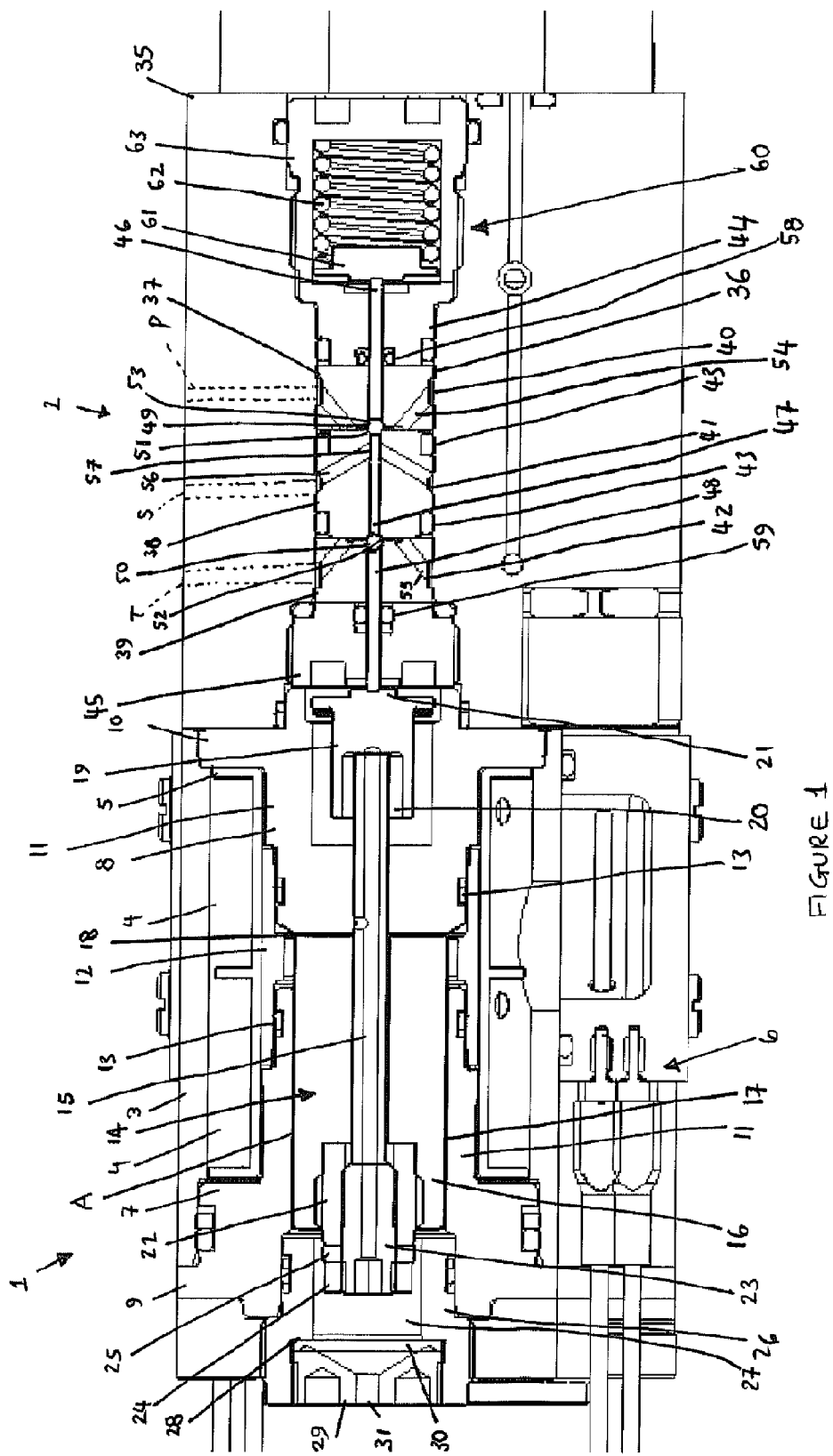
FIG. 1 is a longitudinal sectioned view of a solenoid-operated valve in accordance with the present invention.

Referring now to FIG. 1, the exemplary solenoid-operated valve has two principal sections: a solenoid assembly 1 and a valve assembly 2. The solenoid assembly 1 is driven by electrical signals and serves to operate the valve assembly 2 so as to interrupt or allow the flow of hydraulic fluid.

The solenoid assembly 1 comprises a housing 3 in which there is a pair of axially arranged coils 4 supported on a hollow cylindrical holder 5. The coils 4 are connected to an electrical supply (not shown) by a connector block 6 which will be very familiar to the skilled person and requires no further description. The holder 5 receives a pole piece 7, 8 at each end. Each pole piece 7, 8 has an end flange 9, 10 that extends radially outwards from a generally cylindrical body 11. The flanges 9, 10 are fixed to the housing 3 and the bodies 11 are received in the holder 5. The pole pieces 7, 8 are axially separated by a pressure tube 12 that is disposed radially inboard of the holder 5. The region radially inboard of the pressure tube and the pole pieces 7,8 defines a solenoid chamber A which in use is filled with suitable hydraulic fluid such as oil. An O-ring seal 13 is provided in an annular groove in each cylindrical body 11 of the pole pieces 7, 8 and seals against the pressure tube 12 to prevent egress of the hydraulic fluid from the solenoid chamber A.

A solenoid actuator 14 is disposed concentrically with the coils 4 for axial movement as is well known in the art. In the embodiment shown the actuator 14 comprises a push-rod 15 on which a hollow cylindrical armature 16 is supported. There is a small annular clearance 17 between the outer surface of the armature 15 and the inner surface of the first pole piece 7 to allow for relative axial movement. This annular clearance 17 is commonly referred to as the "running gap". A small axial clearance 18 between one end of the armature 16 and the adjacent second pole piece 8 allows the push rod 15 and armature 16 to travel in the axial direction relative to the pole pieces 7, 8. The push rod 15 extends from the armature 16, through a bore in the second pole piece 8, towards to the valve assembly 2 where it terminates in an adapter 19 for connection to the valve assembly. On the solenoid assembly side, the adapter 19 defines a blind bore 20 for receipt of the push rod 15. The end of the push rod 15 simply abuts a surface defined at the end of the bore 20. The other side of the adapter 19 has a nipple 21 for connection to the valve assembly.

The end of the push rod 15 opposite the adapter 19 is fixed to the armature 16 by means of a fixing assembly that may take any suitable form. In the embodiment shown an externally threaded adjuster 22 is screw-fitted into a threaded bore in the end of the armature 16 and a set screw 23 on the end of the push rod 15 is screw-connected into the adjuster 22. A locking nut 24 and washer 25 secure the connection. The threaded adjuster 22 allows adjustment of the axial position of the push rod 15.

A plug 26 closes the hydraulic chamber A by virtue of it being received in the bore in the first pole piece 7 and itself defines an internal bore 27. At one end, the internal bore 27 accommodates the fixing assembly 22,33,24,25 of the push rod 15. At the other end the bore has a radially outward step 28 and the enlarged diameter of the bore 27 receives a closure member 29. A flexible diaphragm 30 is mounted in the plug 26 such that it abuts the step 28 and closes the bore 27. It is clamped at its periphery against the annular step by the closure member 29 which has a central port 31 for fluid communication with the external environment such that one surface of the diaphragm 30 is exposed to the pressure of the external atmosphere and the other side is exposed to the pressure within the solenoid housing 3. The closure member 29 is generally cylindrical with an external thread for threaded connection with an internal thread defined in the plug 26. The port has a divergent section so as to allow fluid to act on all the exposed surface of the diaphragm (i.e. that which is inboard of the clamped portion)

The valve assembly 2 in the exemplary embodiment shown is a two-position, three-way hydraulic valve assembly but it is to be understood that it may take any suitable form. A valve body 35 has three ports: pressure port P for connection to a supply of pressurised fluid, tank port T for connection to a tank or reservoir and service S for connection to a fluid circuit which may contain, for example, a main-stage valve that is opened or closed under the control of two solenoid-operated control valves of the present invention. The ports P, S, T are represented in dotted line for ease of reference as in practice they will angularly offset around the central longitudinal axis of the valve assembly 2.

The valve body 35 has a central bore of circular cross-section that extends along a longitudinal axis and which defines a valve chamber 36 for receipt of a valve element that is divided into three segments 37, 38, 39. Each valve segment is arranged for communication with one of the fluid ports P, T, S via a shallow annular groove 40, 41, 42 defined in its outer surface. The three segments are separated by a pair of O-rings 43 that are located in annular recesses in the exterior surface of the central segment such that it is sealed to the internal bore surface of the valve body 35. The valve element is retained between bushes 44, 45 that are fixed to the valve body at each end.

Each of the valve element segments 37, 38, 39 has an axial central bore in which a respective metallic actuating pin 46, 47, 48 is free to slide in the axial direction. The three pins are separated by two precision formed spheres 49, 50 which may be produced from, for example, a ceramic or a suitable metal such as zirconium of aluminium alloy. The spheres 49, 50 are designed to seal against respective concave valve seats 51, 52 defined in the central segment 38 around the central bore.

Annular recesses 53 in the inner surfaces of the outer two valve segments 37, 39 provide annular clearances between the surface of the bore and the respective sphere 49, 50 so as to permit limited axial movement of the spheres within the segments. Each of the outer two valve segments 37, 39 has angled passages 54, 55 inclined to the central longitudinal axis which provide fluid communication between the respective shallow grooves 40, 42 and the region around the spheres 49, 50. The central segment has angled passages 56 that extend from the shallow groove 41 to an annular clearance 57 between the central pin 47 and the bore in which it resides.

The two outer pins 46, 48 project into central bores in the guide bushes 44, 45 where they run in dynamic seals 58, 59 for reciprocating motion. The seal 59 in bush is provided by an elastomeric seal such as an O-ring with a back-up seal designed to avoid extrusion of the O-ring seal during its movement.

The end of the pin 48 nearest to the solenoid assembly 1 abuts the nipple 21 defined on the adapter 19.

The pins and spheres 46,47,48,49,50 form an assembly which is axially movable by a small distance to displace one or other of the spheres 49, 50 from its respective valve seat 51, 52 as will be described in more detail below. One end of the pin and sphere assembly is axially loaded by the solenoid assembly 1 and the other end is acted on by a spring-loading assembly 60 that fits into a cavity in the valve body 35. The spring-loading assembly 60 comprises a spring cap 61 for abutment with the end of pin 46. A spring 62 is compressed between the cap and an adjustable retaining member 63 that is screw-connected and sealed to the valve body 35. The retaining member 63 is generally cup-shaped to receive the spring 62.

The solenoid and valve assembly housings 3, 35 are connected together such that the actuator 14 is axially aligned with the pin and sphere assembly 46,47,48,49,50. In this way axial movement of the solenoid actuator 14 causes movement of the pin and sphere assembly (via the adapter 19) so as to change the state of the valve assembly 2.

In operation, the coils 4 are energised appropriately by application of a suitable electrical current. This creates a magnetic field that is transmitted to the actuator 14 via the pole pieces 9, 10. This causes the actuator 14 to move to the right (in the orientation of FIGS. 1 to 3), carrying with it the adapter 19. This in turn acts on the pin and sphere assembly 46,47,48,49,50 which moves to the right against the force applied by the spring assembly 62. This movement serves to displace sphere 49 from its seat 51 thereby allowing hydraulic control fluid from the pressure port P to flow along from the inclined passages 54 in the outer segment 36, between the sphere 49 and its seat 51, along the annular clearance 57 between the pin 47 and the central segment 38 and out along the inclined passages 56 to the service port from where it flows, for example, to a main-stage valve. At the same time sphere 50 is forced against its seat 52 so as to prevent hydraulic control fluid from flowing to tank T.

When the coils 4 are de-energised, the solenoid actuator 14 is no longer driven by a force that moves it to the right. The spring return force acting on the spring cap 61 and the pin 46 biases the assembly 46,47,48,49,50, the adapter 19 and the actuator 14 to move back to the left. This serves to displace sphere 50 from its valve seat 52 thereby allowing fluid communication between the tank and service ports T, S. At the same time sphere 49 is forced back on to its seat such that fluid is prevented from flowing from the pressure port P.

In the present invention the valve chamber 36 of the valve assembly 2 is flooded with hydraulic control fluid and sealed such that it is isolated from the solenoid assembly 2. In particular, the O-ring and back up seal 59 in the bush 45 prevents control fluid from egressing from the valve chamber 36 into the solenoid assembly housing 3 and chamber A.

The solenoid assembly 1 contains a suitable oil and the solenoid housing 3 is sealed from the oil in the surrounding pod (not shown), thus providing an isolated solenoid-operated valve. Since the oil in the solenoid chamber A is isolated from its surroundings it can be selected to be one that is benign to the coating on the armature and thus the risk of the actuator jamming is considerably reduced. The isolation of the solenoid assembly 1 from the surrounding pod environment and the valve assembly 2 means that the risk of ingress of seawater into the solenoid housing 3 is considerably reduced.

Figure 2:
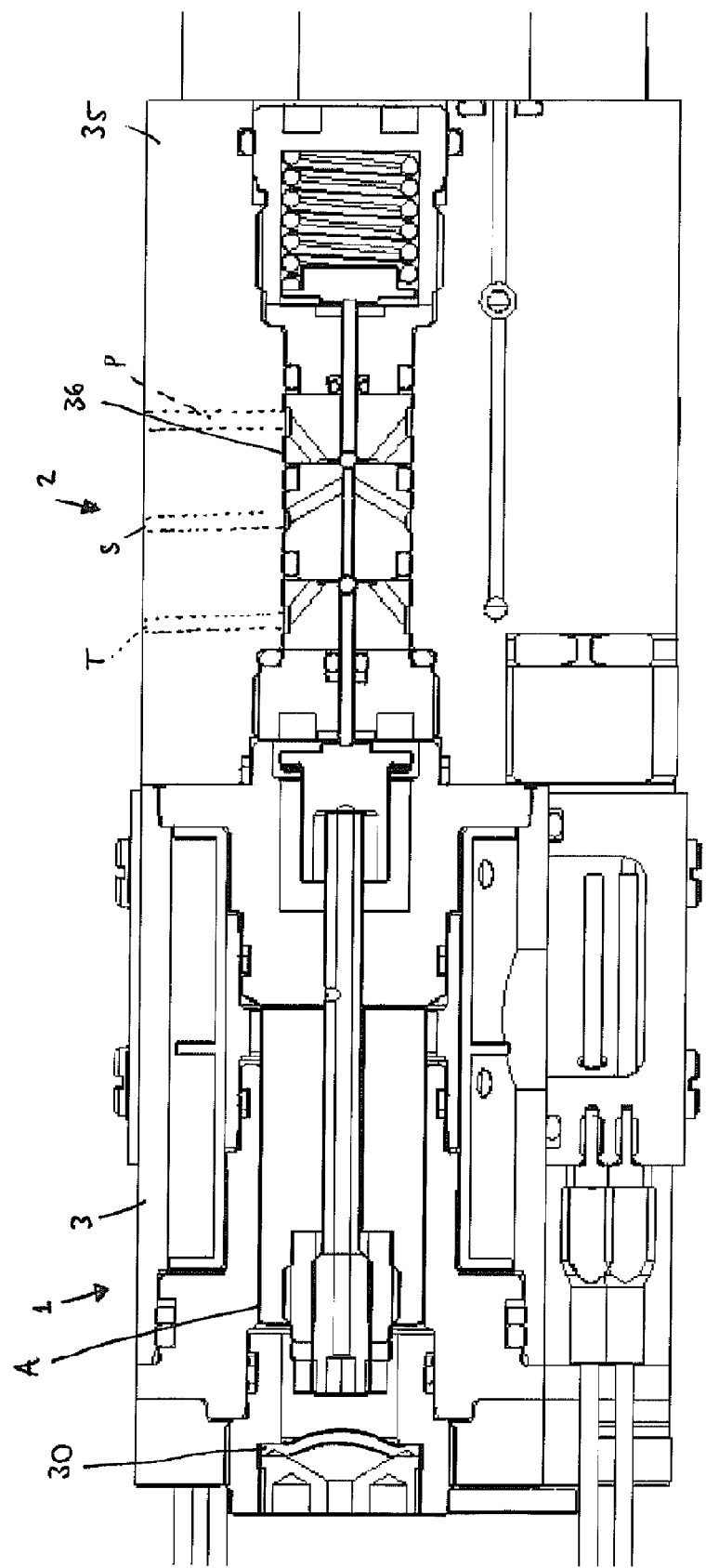
FIG. 2 is a longitudinal section view according to FIG. 1, with a pressure diaphragm in a first position.

The flexible diaphragm 30 ensures that the valve is pressure balanced. In particular, if the pressure within the solenoid assembly 1 is less than that in the surrounding pod the diaphragm 30 deflects inwardly as illustrated in FIG. 2, this pressuring the oil in the solenoid chamber A until is reaches the same pressure as the oil in the pod. FIG. 3 illustrates the position of the diaphragm 30 in the event that the pressure of the oil in the solenoid assembly 1 is greater than that in the pod. It can be seen that the diaphragm 30 deflects outwardly thus reducing the pressure in the solenoid assembly 1.

It will be appreciated that numerous modifications to the above described design may be made without departing from the scope of the invention as defined in the appended claims. For example, the pressure balancing may be performed by any suitable means as opposed to a flexible diaphragm, such as for example a sealed piston. In addition it is to be understood that the valve assembly may take any suitable form including, for example, a single sphere and two pin arrangement such as that described in our co-pending UK patent application No. 1013857.6.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A solenoid-operated valve comprising a valve assembly and a solenoid assembly, the valve assembly comprising: a body with fluid ports for the receipt and delivery of hydraulic control fluid, a valve element disposed in a valve chamber, the valve element being actuable between open and closed positions in order to control the flow of hydraulic control fluid between the fluid ports, the valve element being actuable by a solenoid assembly; the solenoid assembly comprising at least one coil for generating a magnetic field and an actuating member disposed in a solenoid chamber for displacement by the magnetic field, the actuating member being coupled to the valve element, wherein the solenoid chamber is sealed against ingress of hydraulic control fluid from the valve chamber and from the ingress of fluid from the environment surrounding the solenoid assembly, and a movable pressure balancing device provided between the solenoid chamber and the surrounding environment, the balancing device having a first surface exposed to the internal pressure within the solenoid chamber and a second surface exposed to the external pressure of the surrounding environment, the device being movable so as to ensure the forces acting on the first and second surfaces are balanced, and wherein the actuator member comprises a push rod and an armature member, the armature member being fixed to the push rod such that the armature member and the push rod move in unison, the armature member being disposed to receive the magnetic field generated by the at least one coil and being configured to be displaced by a force exerted on the armature member due to the magnetic field, the push rod also being displaced by the force exerted on the armature member due to the fixed connection between the push rod and the armature member.

2. A solenoid-operated valve according to claim 1, wherein the pressure balancing device is in the form of a flexible diaphragm that deflects in response to a pressure imbalance.

3. A solenoid-operated valve according to claim 2, wherein the diaphragm is retained in the solenoid assembly by a clamping arrangement.

4. A solenoid-operated valve according to claim 3, wherein the clamping arrangement clamps the diaphragm at its periphery so as to leave a region in-board of its periphery exposed to the respective fluids.

5. A solenoid-operated valve according to claim 1, wherein the solenoid assembly comprises a solenoid housing and the valve assembly may comprise a valve housing, the two housings being integrally formed or connected together releasably or otherwise.

6. A solenoid-operated valve according to claim 1, wherein the solenoid assembly further comprises one or more pole pieces in which the armature member is supported for sliding or floating movement.

7. A solenoid-operated valve according to claim 1, wherein an isolating seal is provided between valve chamber and solenoid assembly so as to prevent hydraulic control fluid from entering the solenoid assembly.

8. A solenoid-operated valve according to claim 7, wherein the seal is provided around the valve element of the valve assembly and/or around the actuating member of the solenoid.

9. A solenoid-operated valve according to claim 1, wherein the valve element comprises at least one substantially spherical element for sealing against a valve seat, the spherical valve element being axially movable within the valve chamber between a closed position in which it seals against the seat and an open position in which it is displaced from the seat.

10. A solenoid-operated valve according to claim 9, wherein the valve element further comprises at least one actuating pin arranged coaxially with the valve seat for moving the spherical valve element to the open or closed position.

11. A solenoid-operated valve according to claim 10, wherein the at least one actuating pin is connected, directly or indirectly to the solenoid actuating member.

12. A solenoid-operated valve according to claim 9, wherein there are provided at least first, second and third ports in the body of the valve assembly, a first fluid path being defined between the first and second ports and the second fluid path being defined between the second and third ports.

13. A solenoid-operated valve according to claim 12, wherein the spherical member is moveable to open or close the first and second fluid paths.

14. A solenoid-operated valve according to claim 13, wherein there are provided first and second spherical valve elements, each having a corresponding valve seat and a further actuating pin between the two spherical valve elements.

15. A solenoid-operated valve according to claim 1, wherein there is provided a biasing member that applies a force against the actuating member.

16. A subsea control pod containing at least one solenoid operated valve, the solenoid operated valve comprising, a valve assembly and a solenoid assembly, the valve assembly comprising: a body with fluid ports for the receipt and delivery of hydraulic control fluid, a valve element disposed in a valve chamber, the valve element being actuable between open and closed positions in order to control the flow of hydraulic control fluid between the fluid ports, the valve element being actuable by a solenoid assembly; the solenoid assembly comprising at least one coil for generating a magnetic field and an actuating member disposed in a solenoid chamber for displacement by the magnetic field, the actuating member being coupled to the valve element, wherein the solenoid chamber is sealed against ingress of hydraulic control fluid from the valve chamber and from the ingress of fluid from the environment surrounding the solenoid assembly, and a movable pressure balancing device provided between the solenoid chamber and the surrounding environment, the balancing device having a first surface exposed to the internal pressure within the solenoid chamber and a second surface for exposure to the external pressure of the surrounding environment, the device being movable so as to ensure the forces acting on the first and second surfaces are balanced, and wherein the actuator member comprises a push rod and an armature member, the armature member being fixed to the push rod such that the armature member and the push rod move in unison, the armature member being disposed to receive the magnetic field generated by the at least one coil and being configured to be displaced by a force exerted on the armature member due to the magnetic field, the push rod also being displaced by the force exerted on the armature member due to the fixed connection between the push rod and the armature member;

the pod further containing a first hydraulic fluid, the valve assembly being connectable to a source of hydraulic control fluid via a conduit provided in the pod for supplying hydraulic control fluid to the valve chamber, the solenoid chamber being filled with a second hydraulic fluid.

17. A subsea control pod according to claim 16, wherein the pod has a connector for connection to the source of hydraulic control fluid, the valve chamber being in fluid communication with the connector.

18. A method for operating a subsea solenoid-operated valve that comprises a valve assembly and a solenoid assembly, the method comprising connecting the fluid ports of the valve assembly into a hydraulic control fluid supply path that, in use, extends between a source of control fluid and an inlet to a fluid handling member that requires control, such that the control fluid enters a valve chamber of the valve assembly, providing a valve element that is actuable between open and closed positions in order to control the flow of hydraulic control fluid between the fluid ports, the valve element being actuable by a solenoid assembly; the solenoid assembly comprising at least one coil for generating a magnetic field and an actuating member disposed in a solenoid chamber for displacement by the magnetic field, the actuating member being coupled to the valve element, the method further comprising filling the solenoid chamber with a first hydraulic fluid and isolating the filled solenoid chamber by sealing it against ingress of hydraulic control fluid from the valve chamber and sealing the solenoid chamber from the ingress of fluid from the environment surrounding the solenoid assembly, providing a movable pressure balancing arrangement in the solenoid assembly, the balancing device having a first surface exposed to the internal pressure within the solenoid chamber and a second surface for exposure to the external pressure of the surrounding environment, the device being movable so as to ensure the forces acting on the first and second surfaces are balanced, and wherein the actuator member comprises a push rod and an armature member, the armature member being fixed to the push rod such that the armature member and the push rod move in unison, the armature member being disposed to receive the magnetic field generated by the at least one coil and being configured to be displaced by a force exerted on the armature member due to the magnetic field, the push rod also being displaced by the force exerted on the armature member due to the fixed connection between the push rod and the armature member.

19. A method according to claim 18 further comprising placing the valve in a control pod and filling the pod with a second hydraulic fluid.

\* \* \* \* \*